United States Patent
Yen et al.

(10) Patent No.: US 8,977,218 B2
(45) Date of Patent: Mar. 10, 2015

(54) MULTI-MODE WIRELESS TRANSCEIVER AND MULTI-MODE SWITCHING METHOD THEREOF

(75) Inventors: Kuang Yu Yen, Hsinchu County (TW); Der Zheng Liu, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 754 days.

(21) Appl. No.: 13/100,360

(22) Filed: May 4, 2011

(65) Prior Publication Data
US 2012/0108185 A1 May 3, 2012

(30) Foreign Application Priority Data
May 4, 2010 (TW) .............................. 099114203 A

(51) Int. Cl.
*H04B 1/40* (2006.01)
*H04M 1/00* (2006.01)
*H04B 1/00* (2006.01)

(52) U.S. Cl.
CPC ............ *H04B 1/0067* (2013.01); *H04B 1/0064* (2013.01)
USPC ........................ 455/88; 455/550.1; 455/553.1

(58) Field of Classification Search
CPC .... H04B 1/005; H04B 1/0053; H04B 1/0057; H04B 1/0067
USPC ................. 455/73, 77, 78, 82, 83, 88, 550.1, 455/552.1, 553.1
See application file for complete search history.

(56) References Cited

U.S. PATENT DOCUMENTS

| | | | |
|---|---|---|---|
| 6,069,925 A * | 5/2000 | Koh | 375/344 |
| 2003/0006854 A1 * | 1/2003 | Ben-Ayun et al. | 331/175 |
| 2006/0052131 A1 * | 3/2006 | Ichihara | 455/552.1 |
| 2009/0079524 A1 * | 3/2009 | Cyr et al. | 334/78 |
| 2009/0135781 A1 * | 5/2009 | Vaisanen et al. | 370/330 |
| 2009/0180466 A1 * | 7/2009 | Soul et al. | 370/350 |
| 2009/0311925 A1 * | 12/2009 | Hine et al. | 440/13 |
| 2010/0099366 A1 * | 4/2010 | Sugar et al. | 455/75 |
| 2014/0187229 A1 * | 7/2014 | Hamaguchi et al. | 455/418 |

\* cited by examiner

*Primary Examiner* — Andrew Wendell
(74) *Attorney, Agent, or Firm* — McClure, Qualey & Rodack, LLP

(57) ABSTRACT

A multi-mode wireless transceiver and a multi-mode switching method thereof are disclosed to provide at least one wireless transceiving interface capable of dynamically switching between multiple frequency bands. The wireless transceiver comprises: a first RF transceiving circuit for transceiving RF signals of a first frequency band; a second RF transceiving circuit for transceiving RF signals of a second frequency band; a first frequency synthesizer and a second frequency synthesizer for generating a first carrier of the first frequency band and a second carrier of the second frequency band respectively; and a switching circuit for outputting the first carrier to the first RF transceiving circuit, and for determining to output one of the first and second carriers to the second RF transceiving circuit according to a control signal.

16 Claims, 3 Drawing Sheets

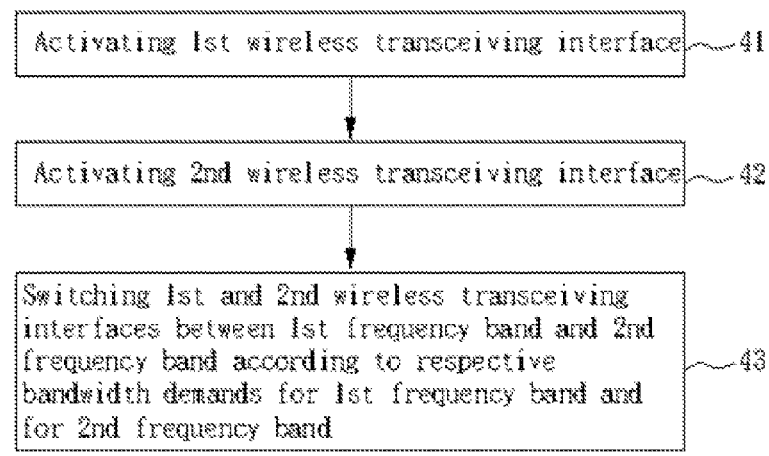

| Operational Mode | I | II | III | IV |
|---|---|---|---|---|
| RF Transceiving Circuit 11 | 5GHz | 5GHz | 2.4GHz | 2.4GHz |
| RF Transceiving Circuit 12 | 5GHz | 2.4GHz | 5GHz | 2.4GHz |

FIG. 3

Activating 1st wireless transceiving interface —41

Activating 2nd wireless transceiving interface —42

Switching 1st and 2nd wireless transceiving interfaces between 1st frequency band and 2nd frequency band according to respective bandwidth demands for 1st frequency band and for 2nd frequency band —43

FIG. 4

MULTI-MODE WIRELESS TRANSCEIVER AND MULTI-MODE SWITCHING METHOD THEREOF

BACKGROUND OF INVENTION

1. Field of the Invention

The present invention relates to wireless devices, and more particularly to a multi-mode switching wireless device and a multi-mode switching method thereof.

2. Description of the Prior Art

Wireless networks have now been extensively applied to various web-based services and devices. In view of both the cost consideration and the prevailing need for the Internet, most commercially available wireless base stations are made for data transmission in the frequency band of 2.4 GHz only, for, such as, browsing the Internet, sending and receiving emails, using instant messaging applications, etc. However, with the rapid and increasing growth of the demand for wireless audio/video transmission, the frequency band of 2.4 GHz has become insufficient because sharing of the 2.4 GHz frequency band between audio/video transmission and data transmission is likely to cause poor presentation of the audio/video data. For addressing this problem, wireless network subscriber has to prepare one 2.4 GHz transceiving circuit and one 5 GHz transceiving circuit for accessing data services and audio/video services at 2.4 GHz and 5 GHz frequency bands, respectively, thereby improving the network services entirely.

However, 2.4 GHz data services and 5 GHz audio/video services are not always required at the same time, so from time to time 5 GHz- related circuits in a network device idle when there are only data services required, and similarly, 2.4 GHz-related circuits in a network device become idle when there are only audio/video services in need. The idleness of the circuits is in a sense waste of resources.

SUMMARY OF INVENTION

In view of this, one objective of the present invention is to provide a multi-mode wireless transceiver and a multi-mode switching method thereof, for wireless transceiving interfaces that allow flexible switch among multiple frequency bands, so as to avoid circuit idleness as happening in the prior-art devices.

Another objective of the present invention is to provide the multi-mode wireless transceiver and the multi-mode switching method thereof, wherein the wireless transceiving interfaces associated with different frequency bands can alternately operate according to a wireless subscriber's different needs for the frequency bands, thereby improving all wireless services presented.

In order to achieve the aforementioned objectives, the present invention discloses a wireless transceiver which comprises:

a first RF transceiving circuit for transceiving RF signals of a first frequency band;

a second RF transceiving circuit for transceiving RF signals of the first frequency band or of a second frequency band;

a first frequency synthesizer for generating a first carrier of the first frequency band;

a second frequency synthesizer for generating a second carrier of the second frequency band;

a switching circuit coupled to the first frequency synthesizer and the second frequency synthesizer, for outputting the first carrier to the first RF transceiving circuit, and for determining to output one of the first and second carriers to the second RF transceiving circuit according to a control signal; and an RF controller for generating the control signal.

In order to achieve the aforementioned objectives, the present invention discloses a multi-mode switching method of a wireless transceiver. The wireless transceiver comprises a first wireless transceiving interface and a second wireless transceiving interface. The multi-mode switching method comprises steps of:

activating the first wireless transceiving interface, wherein the first wireless transceiving interface operates in a first frequency band;

activating the second wireless transceiving interface, wherein the second wireless transceiving interface operates in the first frequency band or in a second frequency band; and switching the second wireless transceiving interface between the first frequency band and the second frequency band according to respective bandwidth demands of the wireless transceiver for the first frequency band and for the second frequency band.

In a preferred embodiment, the wireless transceiver disclosed in the present invention comprises:

N RF transceiving circuits, each for transceiving RF signals of any frequency band of M frequency bands, wherein N is a positive integral and M is greater than one;

M frequency synthesizers, each for generating a corresponding carrier for one of the M frequency bands;

a switching circuit coupled to the M frequency synthesizers for determining to output one of the M corresponding carriers to the N RF transceiving circuits according to a control signal; and an RF controller for generating the control signal.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein:

FIG. 3 summarizes four operational modes of the wireless transceiver of FIG. 1; and FIG. 4 is a flowchart illustrating a multi-mode switching method for a wireless transceiver according to another embodiment of the present invention.

DETAILED DESCRIPTION OF THE PREFERRED EMBODIMENT

Many embodiments of the present invention are directed to a multi-mode wireless transceiver that flexibly switchable among multiple frequency bands. For the sake of illustrative convenience, the plural frequency bands referred in the many embodiments of the present invention are 2.4 GHz and 5 GHz for example, without limitation. In other words, the present invention is applicable to other frequency bands available.

Figure 1:
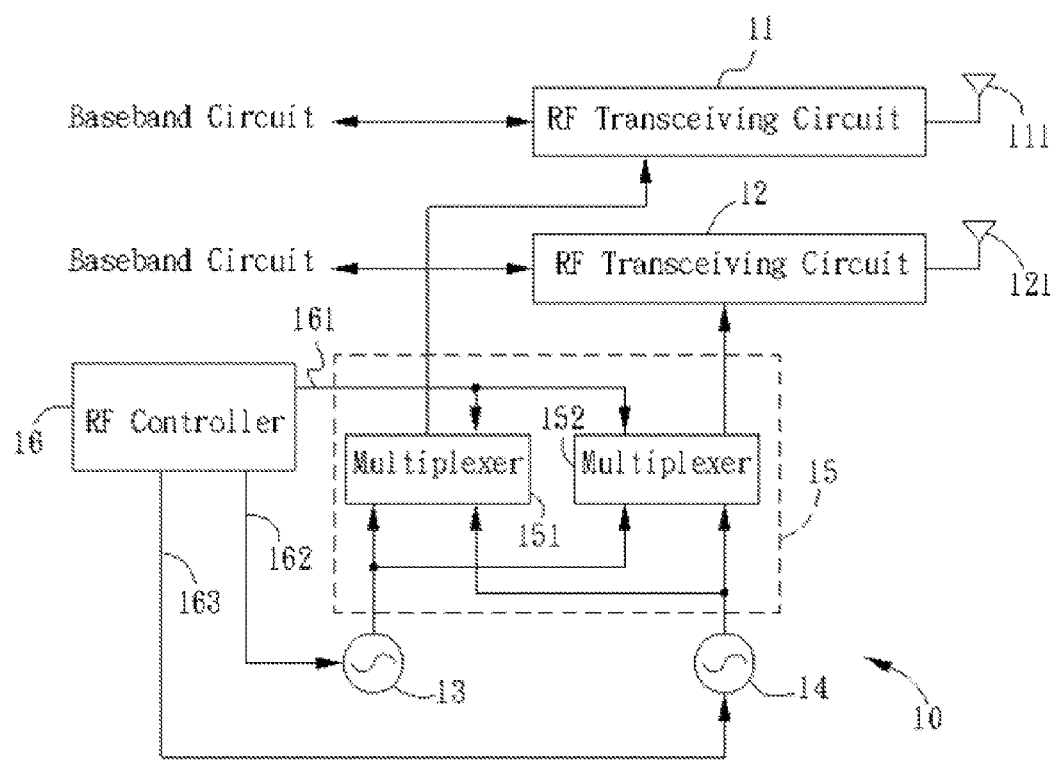
FIG. 1 is a block diagram of a multi-mode wireless transceiver according to one embodiment of the present invention.

FIG. 1 is a block diagram of a multi-mode wireless transceiver according to one embodiment of the present invention. Therein, a wireless transceiver 10 comprises RF transceiving circuits 11 and 12, frequency synthesizers 13 and 14, a switching circuit 15 and an RF controller 16. The RF transceiving circuits 11 and 12 are configured to receive baseband signals from a baseband circuit, and convert the signals into RF signals of a first frequency band or of a second frequency band to be output through antennas 111 and 121. The RF transceiving circuits 11 and 12 are also configured to receive RF signals of the first frequency band or the second frequency band from the antenna 111 and 121, respectively, and convert the signals into baseband signals to be sent to the baseband circuit for subsequent process. The frequency synthesizers 13 and 14 are configured to generate a first carrier of the first frequency band and a second carrier of the second frequency band, respectively, to be sent to the switching circuit 15. Each of the frequency synthesizers may be realized by a voltage controlled oscillator (VCO). The switching circuit 15 comprises multiplexers 151 and 152. The multiplexer 151 is configured to determine to output one of the first and second carriers to the RF transceiving circuit 11 according to a control signal 161 generated by the RF controller 16, so as to generate RF signals corresponding to the frequency bands. The multiplexer 152 is configured to determine to output one of the first and second carriers to the RF transceiving circuit 12 according to the control signal 161, so as to generate RF signals corresponding to the frequency bands. Therefore, in virtue of the control signal 161, the RF transceiving circuits 11 and 12 can be controlled to switch between the first frequency band and the second frequency band independently.

The RF controller 16 is configured to generate the control signal 161 according to the respective bandwidth demands of the wireless transceiver 10 for the first frequency band and the second frequency band, so that the RF transceiving circuits 11 and 12 are enabled to dynamically switch between the frequency bands, thereby timely answering to the changing bandwidth demands. For example, when the first frequency band and the second frequency band are both required, the RF transceiving circuits 11 and 12 may be switched to the first frequency band and the second frequency band, respectively. When the bandwidth demand for the first frequency band (or the second frequency band) sharply increases, the RF transceiving circuits 11 and 12 can be temporarily switched to the first frequency band (or the second frequency band) simultaneously, so as to satisfy the sharply increased demand. Alternatively, when there is no bandwidth demand for the first frequency band (or the second frequency band), the RF transceiving circuits 11 and 12 maybe both switched to the second frequency band (or the first frequency band), so as to enhance signal-transceiving speed and quality in this particular frequency band. Thus, the RF controller 16 can flexibly deploy the bandwidth by adjusting the control signal 161, so as to satisfy changing bandwidth demands for different frequency bands. In addition, when the first frequency band and the second frequency band each have multiple channels (each channel associated with a carrier of a specific frequency), the RF controller 16 can further generate control signals 162 and 163. Therein, the control signal 162 is sent to the frequency synthesizer 13, for controlling the latter to generate a carrier of any channel in the first frequency band, while the control signal 163 is sent to the frequency synthesizer 14, for controlling the latter to generate a carrier of any channel in the second frequency band. Therefore, the RF controller 16 can use the control signals 161, 162 and 163 in combination to control which channel of which frequency band the RF transceiving circuits 11 and 12 are to be respectively switched to.

Figure 2:
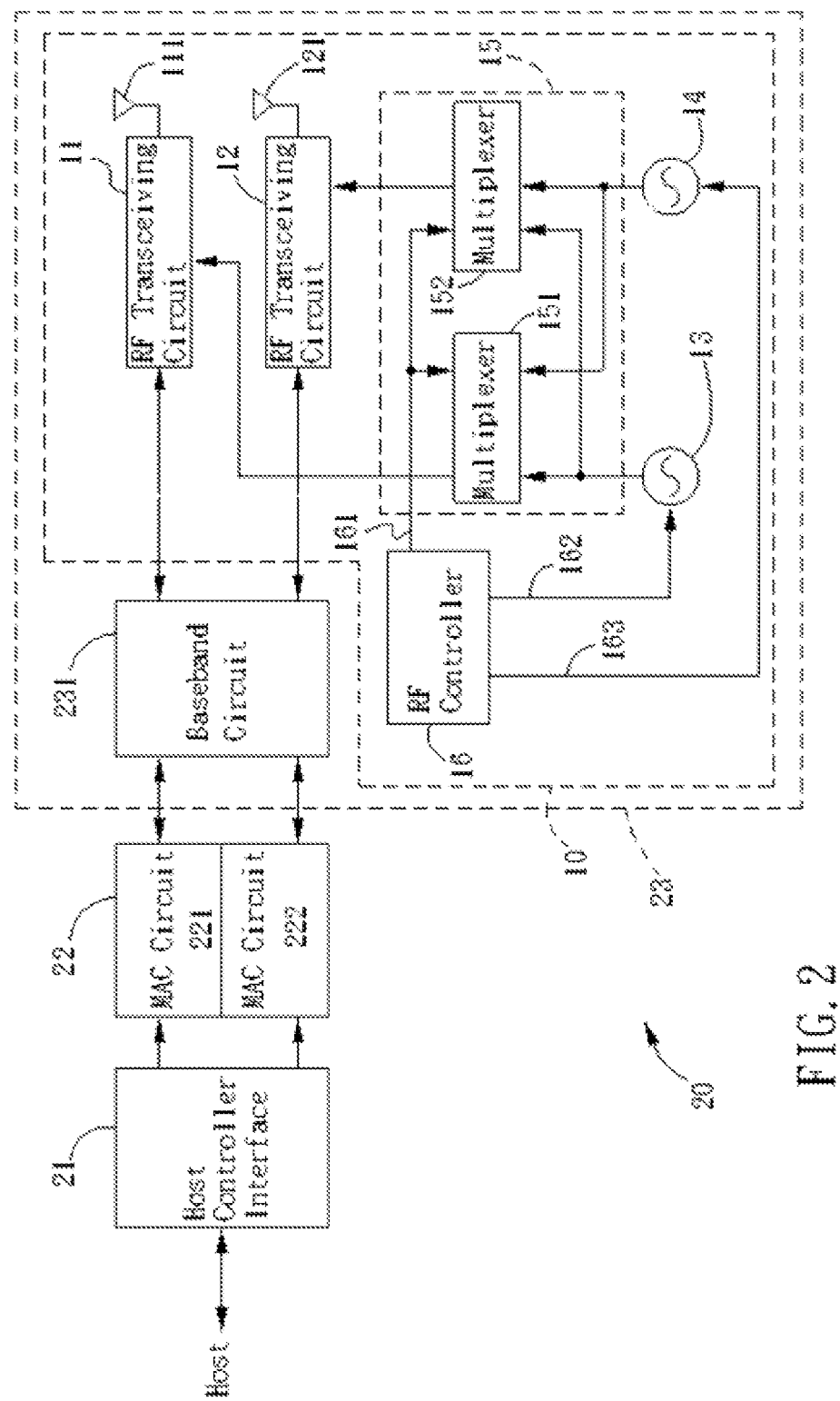
FIG. 2 shows an exemplary hardware structure of a wireless transceiver 10 applied to a wireless LAN.

In a preferred embodiment, the wireless transceiver 10 is applied to a wireless WLAN. FIG. 2 shows an exemplary hardware structure of a wireless transceiver 10 applied to the wireless LAN. Therein, the wireless transceiver 10 is incorporated in a wireless module 20, which is communicated with a host through a host controller interface 21. For example, the wireless module 20 may be a wireless interface chip or a wireless interface card of IEEE 802.11 specification, and the host may be a personal computer or a laptop computer, while the host controller interface may be a USB or a PCI or PCI-E interface. As shown in FIG. 2, the wireless module 20 further comprises a media access control (MAC) circuit 22 and a physical layer (PHY) circuit 23. In addition to the wireless transceiver 10, the PHY circuit 23 has a baseband circuit 231, for processing baseband signals. The MAC circuit 22 comprises MAC circuits 221 and 222, for controlling access to the first frequency band and the second frequency band, respectively. For example, the MAC circuits 221 and 222 can output access control signals that are sent to the RF controller 16 through the baseband circuit 231, so as to make the RF controller 16 generate the control signals 161~163 as required.

In a typical wireless LAN, the frequency bands usually used are 2.4 GHz and 5 GHz. Assuming that the first frequency band is 5 GHz and the second frequency band is 2.4 GHz. Thus, in the present preferred embodiment, while the RF transceiving circuits 11 and 12 switch between the first frequency band and the second frequency band, respectively, four operational modes, namely Mode I~IV, are available. Referring to FIG. 3, in Mode I, the RF transceiving circuits 11 and 12 both operate in the 5 GHz frequency band. Since IEEE 802.11n specification supports MIMO (Multiple-Input Multiple-Output), when the wireless transceiver 10 is switched into Mode I, for the 5 GHz frequency band, the wireless transceiver 10 is in a 2T2R (2 transmit 2 receive) state, yet for the 2.4 GHz frequency band, the wireless transceiver 10 is in its standby state. In Mode II, the RF transceiving circuits 11 and 12 operate in the 5 GHz and 2.4 GHz frequency bands, respectively. Thus, when the wireless transceiver 10 is switched into Mode II, for both the 5 GHz and 2.4 GHz frequency bands, the wireless transceiver 10 is in a 1T1R (1 transmit 1 receive) state. Similarly, in Mode III, the RF transceiving circuits 11 and 12 operate in the 5 GHz and 2.4 GHz frequency bands, respectively. Thus, when the wireless transceiver 10 is switched into Mode III, for both the 5 GHz and 2.4 GHz frequency bands, the wireless transceiver 10 is in a 1T1R (1 transmit 1 receive) state. In Mode IV, the RF transceiving circuits 11 and 12 both operate in the 2.4 GHz frequency band. Thus, when the wireless transceiver 10 is switched into Mode IV, for the 2.4 GHz frequency band, the wireless transceiver 10 is in a 2T2R state and for the 5 GHz frequency band it is in the standby state. Thereupon, when the wireless transceiver 10 switches among the working states (i.e. 2T2R, 1T1R and standby) in terms of the 5 GHz frequency band, it has to correspondingly switch in terms of the 2.4 GHz frequency band at the same time, vice versa. For instance, when the wireless transceiver 10 in the 5 GHz frequency band switches from 2T2R to 1T1R, it has to switch from standby to 1T1R in the 2.4 GHz frequency band. If it in the 2.4 GHz frequency band switches to 2T2R from standby, it has to switch from 2T2R to standby in the 5 GHz frequency band at the same time. Different combinations shall work in the same manner.

In the present preferred embodiment, the wireless transceiver 10 is configured to switch among the four operational modes according to the bandwidth demand for each of the first frequency band and the second frequency band, which depends on the wireless service required by a subscriber. Generally, a subscriber requests for a wireless service by executing the relevant application, so the wireless transceiver 10 can use the application executed by the subscriber to determine the bandwidth demand for each of the first frequency band and the second frequency band. In the foregoing instance concerning the wireless LAN, data services usually use the 2.4 GHz frequency band, and audio/video services usually use the 5 GHz frequency band. The so-called data services primarily include Internet-based services, such as webpage browsing, email services, instant messaging services, etc. The wireless transceiver 10 may act as a subscriber-end device connected to an access point that has linked to the Internet so as to access various Internet-based services. For audio/video services, the wireless transceiver 10 is regarded as a software access point (software AP), for providing wirelessly audio/video for other computers or consumer electronics (e.g. TV sets or projectors) to play. Hence, the wireless transceiver 10 may have its operational mode dynamically switched according to the actual use of data services and audio/video services. For example, when the subscriber needs to go the Internet through 2.4 GHz connection for some data service and has no demand for any audio/video services through 5 GHz connection, the wireless transceiver 10 can be switched into Mode IV (referring to FIG. 3) so that the subscriber can access the Internet in the 2T2R state, thereby obtaining data services with enhanced quality. Afterward, when the subscriber also wants to enjoy some audio/video service, the wireless transceiver 10 may be switched into Mode II or Mode III, where the data service and the audio/video service are obtained in the 1T1R state of the wireless transceiver 10. In a further example, when there is a large amount of audio/video data to be transmitted or it is desired to improve the quality of audio/video services, the wireless transceiver 10 may be switched to Mode I, where data transmission is performed in the 2T2R state. At the same time, if the subscriber also needs Internet access, since data transmission in this particular use typically occurs intermittently (in the case webpage browsing, data receipt is suspended between the completion of downloading one webpage and initiation of downloading a new webpage), the wireless transceiver 10 can be switched to Mode II or III only when there are data or, if no service data, connectivity data (e.g. access point beacons, for maintaining the connectivity) to be received, and then switched back to Mode I as soon as receipt of the service data or connectivity data is completed, so as to ensure the quality of the audio/video service, while maintaining the connectivity for the desired data service.

Moreover, the wireless transceiver 10 is capable of adjusting the bandwidth demands for the first frequency band and the second frequency band according to the properties of the frequency bands and the desired quality of wireless services (QoS). For instance, since more sources cause interference in the 2.4 GHz frequency band, those wireless services where stability of real-time response is important, even if the throughput required is not high, are incorporated into the bandwidth demand for 5 GHz.

Preferably, the respective bandwidth demands for the first frequency band and the second frequency band have corresponding priority levels, and the wireless transceiver 10 is capable of identifying the priority levels of different bandwidth demands and switching the operational modes accordingly. For example, the RF controller 16 may generate the control signal 161 according to the order of the priority levels, so as to such switch the operational modes that the bandwidth demands with higher priority levels are satisfied first. The priority levels may depend on the wireless services provided in each frequency band. For example, audio/video services and data services are provided in the 5 GHz frequency band and the 2.4 GHz frequency band, respectively, so the priority levels are such set that the bandwidth demand for the 5 GHz frequency band has a higher priority level than that of the bandwidth demand for the 2.4 GHz frequency band. Alternative, the priority levels may be determined by time points where the bandwidth demands are generated. For example, if the bandwidth demand for the 2.4 GHz frequency band is generated prior to the generation of that for the 5 GHz frequency band, it is determined that the priority level of the bandwidth demand for the 2.4 GHz frequency band is higher than that of the bandwidth demand for the 5 GHz frequency band.

Preferably, the wireless transceiver 10 is capable of performing flow control of the first frequency band and the second frequency band. For instance, the wireless transceiver 10 (or the wireless module 20) may be preprogrammed with the availability rate of wireless resources (i.e. the RF transceiving circuits 11 and 12) or throughput rate between the 2.4 GHz frequency band and the 5 GHz frequency band as 1:1, meaning that the 2.4 GHz frequency band and the 5 GHz frequency band have equal time to use the wireless resources, or they have equal throughputs. Thereby, the wireless transceiver 10 is able to control its data flows in the first frequency band and the second frequency band, respectively.

The embodiment of FIG. 1 may be extended to have three or more RF transceiving circuits and frequency bands. For example, the wireless transceiver may have N RF transceiving circuits, M frequency synthesizers, one switching circuit and an RF controller, wherein N and M are both positive integrals greater than one (wherein, when N=M=2, it is the wireless transceiver 10). Each said RF transceiving circuit is capable of transceiving RF signals of any frequency band of the M frequency bands. The M frequency synthesizers are for generating corresponding carriers for the M frequency bands, and the switching circuit is configured to select the corresponding frequency synthesizer for output according to the control signals generated by the RF controller, so as to provide the respective carriers required by the RF transceiving circuits. Therefore, this wireless transceiver possesses M*N operational modes that can be switched into by using the control signals.

FIG. 4 is a flowchart illustrating a multi-mode switching method for a wireless transceiver according to another embodiment of the present invention. In the present embodiment, the wireless transceiver comprises a first wireless transceiving interface and a second wireless transceiving interface for respectively operating in a first frequency band or a second frequency band. When the embodiment is applied to the wireless transceiver 10 of FIG. 1, the first wireless transceiving interface is provided by the RF transceiving circuit 11 and the antenna 111, while the second wireless transceiving interface is provided by the RF transceiving circuit 12 and the antenna 121. In Step 41, the first wireless transceiving interface is activated to operate in the first frequency band or the second frequency band. In Step 42, the second wireless transceiving interface is activated to operate in the first frequency band or the second frequency band. Therefore, according to the frequency bands (the first and/or second frequency band) where the first and second wireless transceiving interfaces operate in, the wireless transceiver may make up the four operational modes shown in FIG. 3. Therein, the first and second frequency bands are the 5 GHz and 2.4 GHz frequency bands, respectively. In Step 43, according to the respective bandwidth demands of the wireless transceiver for the first frequency band and for the second frequency band, the first wireless transceiving interface and the second wireless transceiving interface are switched between the first and second frequency bands, respectively.

Preferably, in the event that the wireless transceiver supports MIMO (Multiple-Input Multiple-Output), when establishing a first connection with a first wireless device (or a first wireless network) operating in the first frequency band (e.g. 5

GHz), the wireless transceiver may inform the wireless device that it is capable of 2T2R transmission, so that the first connection can selectively work in 2T2R, 1T1R or standby state. At this time, 1T1R and standby state may be regarded as two states of different power-saving levels. Similarly, when establishing a second connection with a second wireless device (or a second wireless network) operating in the second frequency band (e.g. 2.4 GHz), the wireless transceiver may inform the wireless device that it is capable of 2T2R transmission, so that the second connection can also selectively work in 2T2R, 1T1R or standby state. Of course, the working states of the first and second connections have to match mutually while their switching among the three states has to be done simultaneously. For example, when the first connection is switched from 2T2R to 1T1R, the second connection has to be simultaneously switched from standby to 1T1R. At this time, for the first connection, the first wireless device takes this situation as that the wireless transceiver turns off one of the wireless transceiving interfaces for saving power, yet in fact, the wireless transceiver diverts this wireless transceiving interface to the second connection. Other switching combinations between the first and second connections may perform under the same principle. Hence, in virtue of the wireless transceiving interfaces capable of changing working frequency bands flexibly, the wireless transceiver can build two connections with the capability up to 2T2R by merely using two such wireless transceiving interfaces.

In other words, in the embodiments of the present invention, the wireless transceiver comprises N RF transceiving circuits capable of building an N transmit N receive path in the first frequency band and building an N transmit N receive path in the second frequency band. Taking what is shown in FIG. 2 as an example, the wireless transceiver 10 comprises 2 RF transceiving circuits, so can build a 2T2R path in the first frequency band and another 2T2R path in the second frequency band. Of course, in another embodiment, the wireless transceiver has only one RF transceiving circuit for building a 1T1R path in the first frequency band and a 1T1R path in the second frequency band. The wireless transceiver thus can switch between frequency bands so as to improve the overall quality of wireless services.

Preferably, in Step 43, the first and second wireless transceiving interfaces are switched between the first and second frequency bands respectively according to the propriety levels of the respective bandwidth demands for the first frequency band and the second frequency band. For example, the propriety level of the bandwidth demand for the first frequency band may be set as higher than that of the bandwidth demand for the second frequency band. In another example, among the bandwidth demands for the first frequency band and the second frequency band, the bandwidth demands generated earlier are set to have their propriety levels higher than those of the bandwidth demands generated later.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless transceiver, comprising:
   a first RF transceiving circuit for transceiving RF signals of one of a first frequency band and a second frequency band;
   a second RF transceiving circuit for transceiving RF signals of one of the first frequency band and the second frequency band;
   a first frequency synthesizer for generating a first carrier of the first frequency band;
   a second frequency synthesizer for generating a second carrier of the second frequency band;
   a switching circuit directly coupled to the an output of the first frequency synthesizer and directly coupled to an output of the second frequency synthesizer, the switching circuit being further configured to output the first carrier to the first RF transceiving circuit, and the switching circuit being further configured to output one of the first and second carriers to the second RF transceiving circuit according to a control signal; and
   an RF controller for generating the control signal.

2. The wireless transceiver of claim 1, wherein the first RF transceiving circuit is configured to further transceive the RF signals of the second frequency band, and the switching circuit is configured to output one of the first and second carriers to the first RF transceiving circuit according to the control signal.

3. The wireless transceiver of claim 2, wherein the RF controller generates the control signal according to respective bandwidth demands for the first frequency band and for the second frequency band.

4. The wireless transceiver of claim 3, wherein the RF controller generates the control signal according to priority levels corresponding to the respective bandwidth demands for the first frequency band and for the second frequency band.

5. The wireless transceiver of claim 4, wherein the priority level of the bandwidth demand for the first frequency band is higher than the priority level of the bandwidth demand for the second frequency band.

6. The wireless transceiver of claim 4, where between the respective bandwidth demands for the first frequency band and for the second frequency band, the priority level of the bandwidth demand generated earlier is higher.

7. A multi-mode switching method of a wireless transceiver, the wireless transceiver comprising a first wireless transceiving interface and a second wireless transceiving interface, and the multi-mode switching method comprising steps of:
   activating the first wireless transceiving interface, wherein the first wireless transceiving interface operates at least in a first frequency band;
   activating the second wireless transceiving interface, wherein the second wireless transceiving interface operates in the first frequency band or in a second frequency band; and
   switching the second wireless transceiving interface between the first frequency band and the second frequency band according to respective bandwidth demands of the wireless transceiver, wherein the respective bandwidth demands have corresponding priority levels for the first frequency band and for the second frequency band.

8. The multi-mode switching method of claim 7, wherein the first wireless transceiving interface is configured to further operate in the second frequency band, and the multi-mode switching method further comprises:
   switching the first wireless transceiving interface between the first frequency band and the second frequency band according to the respective bandwidth demands of the wireless transceiver for the first frequency band and for the second frequency band.

9. The multi-mode switching method of claim 8, wherein when the wireless transceiver supports MIMO (Multiple-Input Multiple-Output), the switching method further comprises:

switching the wireless transceiver among a 2T2R (2 transmit 2 receive) state, a 1T1R (1 transmit 1 receive) state and a standby state in the first frequency band and in the second frequency band, respectively, wherein switching among the states in the first frequency band corresponds to switching among the states in the second frequency band.

10. The multi-mode switching method of claim 8, wherein the first wireless transceiving interface and the second wireless transceiving interface are switched between the first frequency band and the second frequency band, respectively, according to priority levels corresponding to the respective bandwidth demands for the first frequency band and for the second frequency band.

11. The multi-mode switching method of claim 10, wherein the priority level of the bandwidth demand for the first frequency band is higher than the priority level of the bandwidth demand for the second frequency band.

12. The multi-mode switching method of claim 10, wherein between the respective bandwidth demands for the first frequency band and for the second frequency band, the priority level of the bandwidth demand generated earlier is higher.

13. A wireless transceiver, comprising:

N RF transceiving circuits, each for transceiving RF signals of any frequency band of M frequency bands, wherein N is a positive integral and M is greater than one;

wherein the wireless transceiver is configured to provide an N transmit N receive connection in each of the M frequency bands;

M frequency synthesizers, each for generating a corresponding carrier for one of the M frequency bands;

a switching circuit directly coupled to an output of each of the M frequency synthesizers; and an RF controller coupled to each of the M frequency synthesizers and to the switching circuit, wherein the RF controller configures each of the M frequency synthesizers to generate a corresponding carrier for one of the M frequency bands, wherein the RF controller further configures the switching circuit to output one of the M corresponding carriers to the N RF transceiving circuits, wherein the RF controller configures each of the M frequency synthesizers and the switching circuit according to an order of priority levels corresponding to respective bandwidth demands for each of the M frequency bands.

14. The wireless transceiver of claim 13, wherein the priority levels are assigned based on at least one of:

a type of wireless service provided in the frequency bands; and time points in which corresponding carriers for frequency bands are generated.

15. The wireless transceiver of claim 14, wherein for priority levels assigned based on the time points in which corresponding carriers for frequency bands are generated, a higher priority is assigned for corresponding carriers for frequency bands generated earlier.

16. The wireless transceiver of claim 13, wherein the RF controller configures each of the M frequency synthesizers and the switching circuit according to flow control of the M frequency bands, wherein the flow control is based on one of:

equal distribution of wireless resources; and equal throughput.

* * * * *